United States Patent [19]
Waress

[11] 3,949,503
[45] Apr. 13, 1976

[54] EMERGENCY WARNING DEVICE

[76] Inventor: Edward T. Waress, 6196 Estes St., Arvada, Colo. 80004

[22] Filed: Aug. 5, 1974

[21] Appl. No.: 494,535

Related U.S. Application Data

[63] Continuation-in-part of Ser. No. 397,939, Sept. 17, 1973, abandoned.

[52] U.S. Cl. .............................. 40/129 C; 40/125 G
[51] Int. Cl.² .......................................... G09F 21/04
[58] Field of Search .......... 40/129 C, 129 R, 125 N, 40/125 H, 125 R, 125 F, 125 G, 82–85; 116/63 P, 28; 350/117

[56] References Cited
UNITED STATES PATENTS

| | | | |
|---|---|---|---|
| 446,021 | 2/1891 | Semple | 40/82 |
| 1,674,565 | 6/1928 | Peterson | 40/125 G UX |
| 2,561,188 | 7/1951 | Ferguson | 40/129 C UX |
| 3,042,111 | 7/1962 | Wytovich | 40/129 C UX |
| 3,245,635 | 4/1966 | Signor | 40/85 X |
| 3,255,725 | 6/1966 | Von Kreidner et al. | 40/129 C UX |
| 3,430,374 | 3/1969 | Woodard | 40/129 C |
| 3,563,594 | 2/1971 | London | 40/129 C |
| 3,594,938 | 7/1971 | Mosch | 40/129 C |

FOREIGN PATENTS OR APPLICATIONS 357,752  10/1931  United Kingdom ............... 40/129 C

*Primary Examiner*—Louis G. Mancene
*Assistant Examiner*—John F. Pitrelli
*Attorney, Agent, or Firm*—Reilly and Hancock

[57] ABSTRACT

An emergency warning device for a motor vehicle is made up of a long, brightly colored plastic sheet with a warning message which is stored on a roller and adapted to be mounted on the inside surface of the trunk lid of the vehicle. In order to warn other motorists of danger or emergency when the vehicle is stopped on a street or highway, the plastic sheet can be displayed by withdrawing it from the roller with the trunk in its open position; or, because of its length, it can be fed through the forward crack between the trunk lid and the vehicle body, brought across the top surface of the trunk and attached to the car, with the trunk closed to protect the contents. The proximity of the message to the bottom end of the sheet enables the message to be visible either when the sheet is partially unrolled or when fully unrolled and stretched over the outer surface of a closed trunk.

13 Claims, 9 Drawing Figures

EMERGENCY WARNING DEVICE

CROSS-REFERENCE TO OTHER APPLICATIONS

This application is a continuation-in-part of application Ser. No. 397,939, filed Sept. 17, 1973, now abandoned, for EMERGENCY WARNING DEVICE.

This invention relates generally to safety devices for use with motor vehicles and more particularly to warning signs for indicating to other moving vehicles the danger of a vehicle stopped on a street or highway for the purpose of reducing the likelihood of an accident.

A car which has run out of gas or is disabled by some other circumstance and is stopped on the shoulder of or in the roadway poses a real danger of causing an accident, since it may not be seen in time, or the situation may not be properly judged by other motorists. A number of safety warning devices have been devised whose purpose is to increase the visibility of the stopped car or to draw attention to it. One such device is disclosed in U.S. Pat. No. 3,255,725 to Von Kreidner, in which a sign is rolled up on a spring roller attached to the inner surface of a car's trunk lid and is used with the trunk open and the sign stretched between the lid and latch in the lower part of the trunk. However, use of such a device exposes the contents of the trunk to inclement weather or possible theft should the car be left for an extended time, and is of use only in a limited number of situations, lacking the versatility of the invention hereinafter described.

It is an object of the present invention to provide a novel and improved visible warning device for vehicles which can be seen for great distances and will attract the attention of other drivers.

It is another object of this invention to provide a warning device which is readily and quickly accessible for use either in the trunk of a car or can be hand-held.

It is another object of this invention to provide an emergency sign which can be extended from within a completely closed trunk over the back of the car to serve as a visible warning to other motorists.

It is another object of this invention to provide a versatile and portable warning device which can be used from its fixed storage location or removed for use in other locations or can be hand-held.

It is still another object of the present invention to provide an emergency sign for motor vehicles which is very durable and economical while being made up of a minimum number of parts and can be removably attached to the inner trunk lid of a vehicle.

Briefly, the warning device of the present invention consists of a brightly colored sheet or curtain which can be rolled onto an enclosed roller and stored on the inside of an automobile trunk lid so as to be quickly available in emergencies. Hooks at its lower corners attach the lower end of the curtain to the bumper or other fixed portion of the car during use. A primary feature is the length of the curtain which allows the curtain to be drawn out from the roller, inserted through the forward crack between the car body and the open trunk lid and brought around the top of the trunk lid. The lid is then closed, protecting the contents of the trunk, and the curtain is fastened by the corner hooks to the bumper. A message on the curtain in black lettering is visible against the bright color of the curtain on the back surface of the car. The device also can be removed from its holder or other suspension means in the trunk and hand-held with the sign in the extended position if desired.

Other objects, advantages and capabilities of the present invention will become more apparent as the description proceeds when taken in conjunction with the accompanying drawings, in which.

Figure 1:
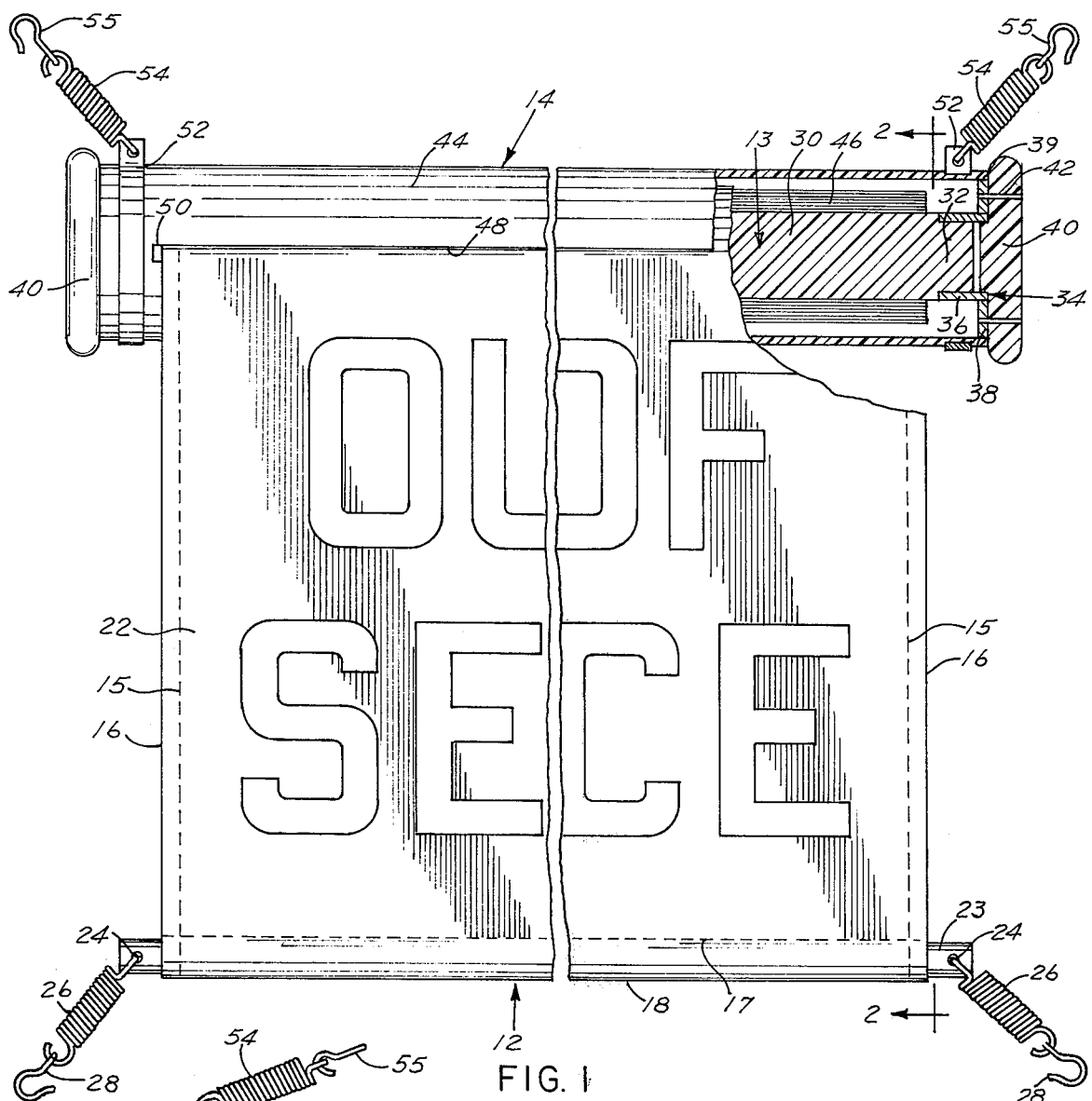
FIG. 1 is a front view partially in section of one embodiment of the invention.
Figure 2:
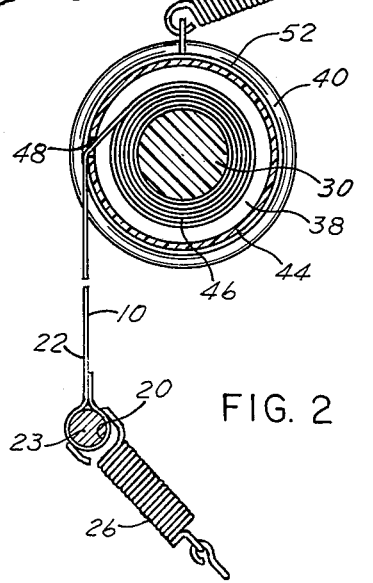
FIG. 2 is a cross-sectional view taken along lines 2—2 of FIG. 1.
Figure 6:
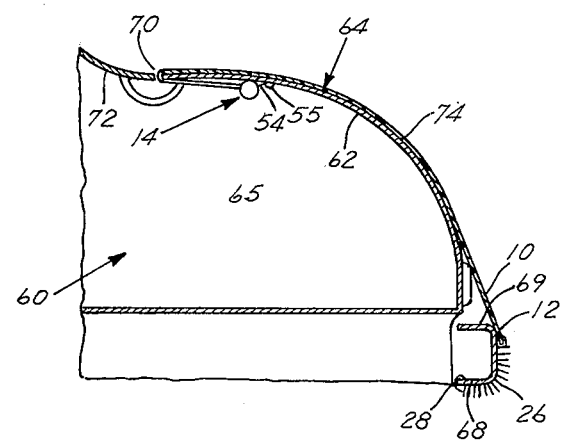
Figure 3:
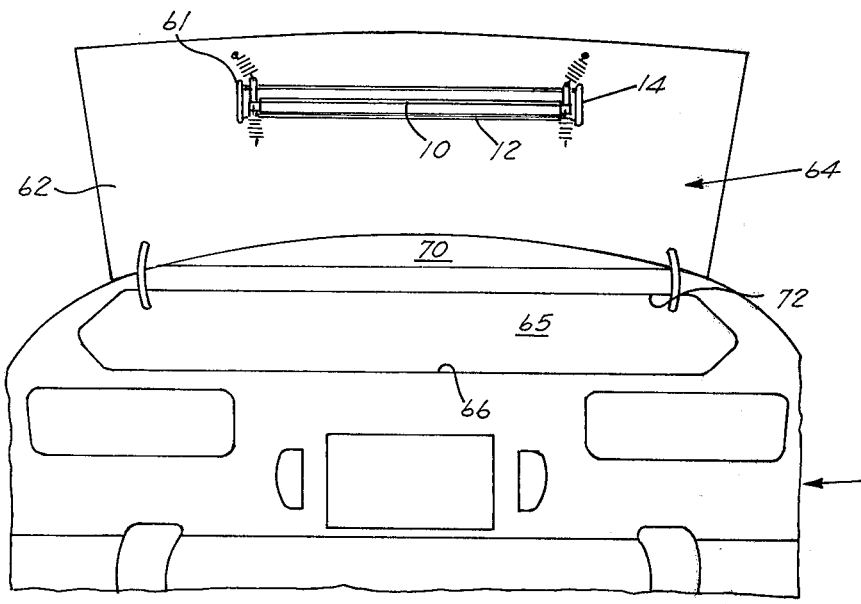
Figure 4:
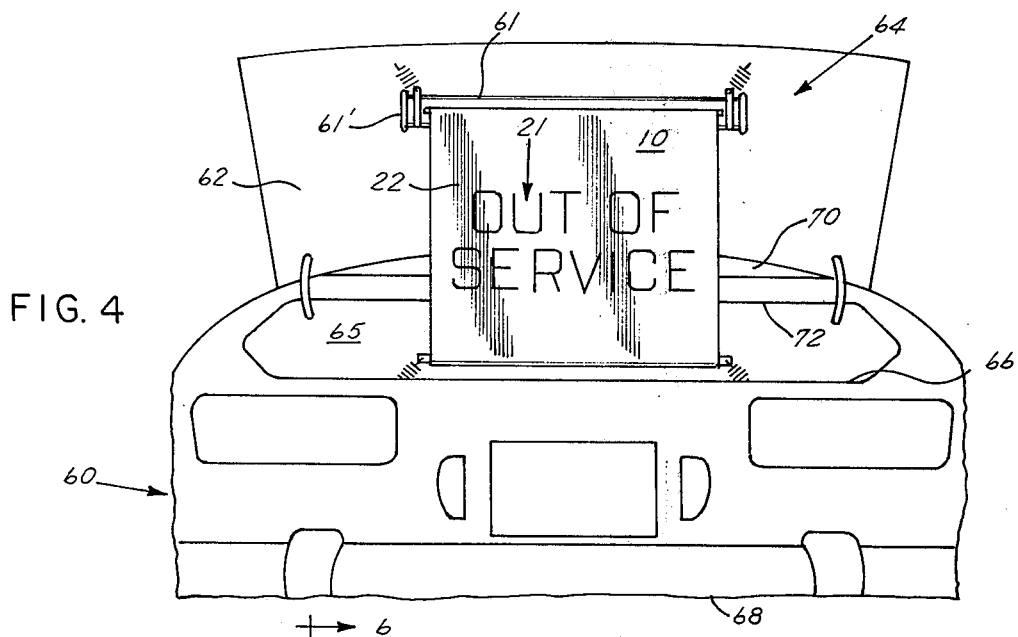
Figure 5:
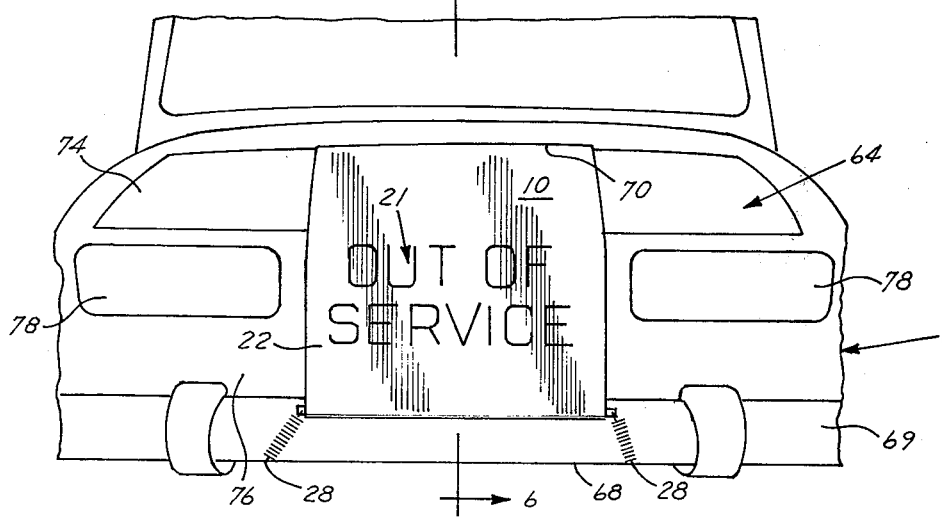
Figure 7:
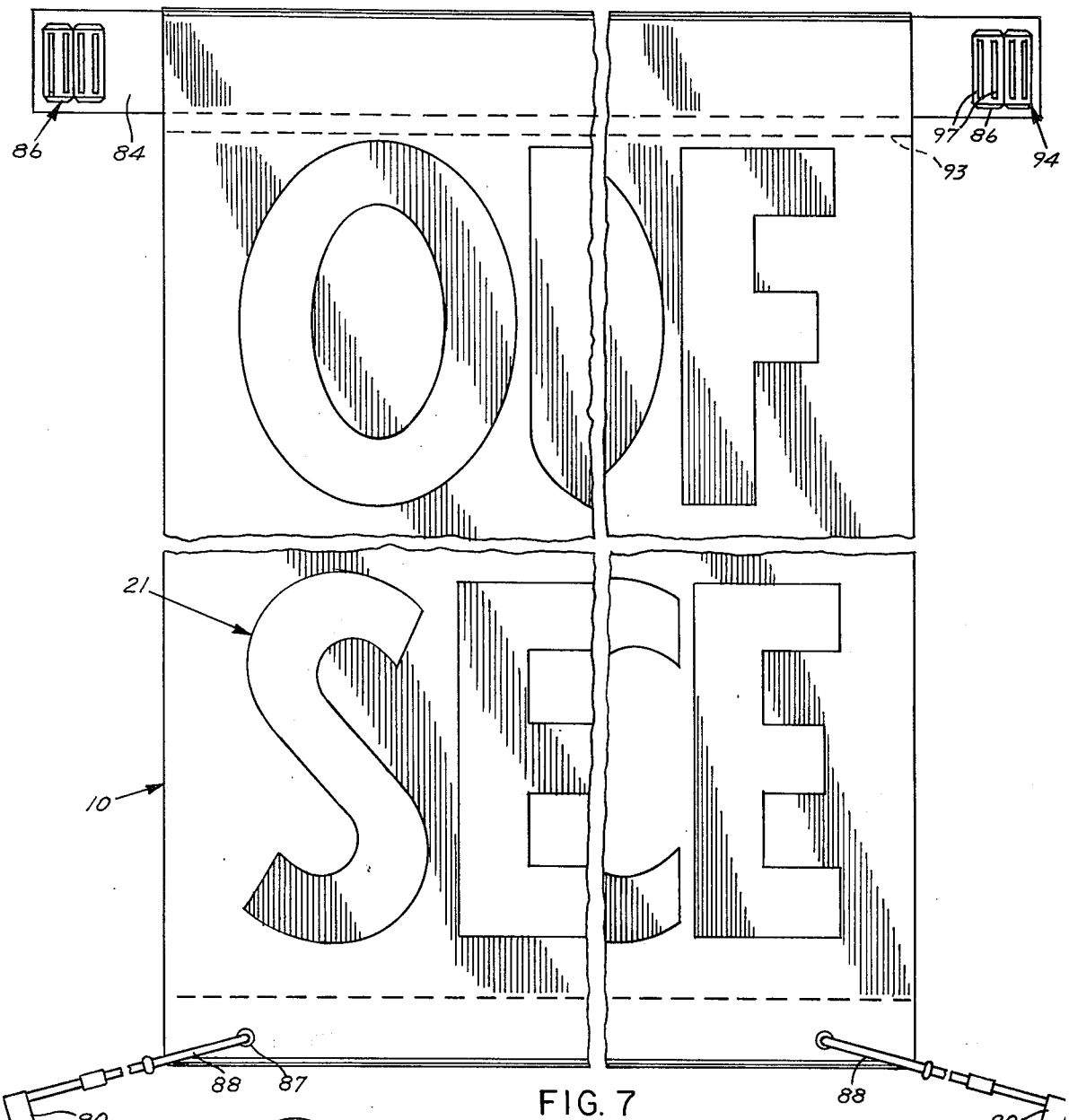
Figure 8:
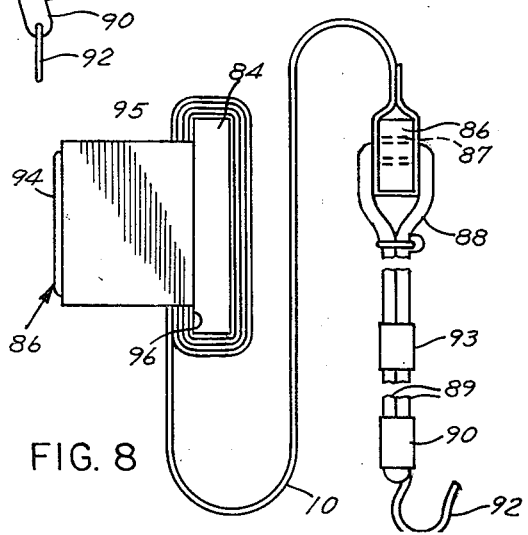
Figure 9:
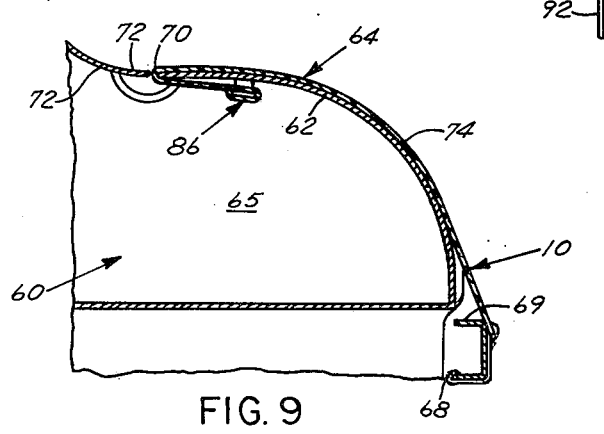

FIG. 3 is a rear view of a motor vehicle showing the invention with a modified holder which is attached to the trunk of the vehicle ready for use, FIG. 4 is a rear view of a motor vehicle showing the modified form of the invention of FIG. 3 in the extended position, FIG. 5 is a rear view of a motor vehicle showing the embodiment of FIGS. 1 and 2 in another extended position, FIG. 6 is a side sectional view along lines 6—6 of FIG. 5, FIG. 7 is a front view of another embodiment of the invention, FIG. 8 is a side view of the embodiment shown in FIG. 7, and FIG. 9 is a side view of the embodiment of FIG. 8 with the curtain shown in extended position.

The warning device in the embodiment shown in FIGS. 1 and 2 comprises a sheet 10 of safety orange plastic material which suitably may be on the order of 6 feet long by 2 feet wide including a free bottom end 12 and an upper end which is attached to a roller 13 journaled within a roller apparatus generally designated at 14. The sheet has narrow stitched hems 15 along the sides 16 and a hem 17 extending along lower extremity 18. The hems 15 along the sides 16 terminate 1 inch short of the bottom edge 18 so that a horizontal passageway 20 open at both ends is defined by the hem 17 for insertion of an elongated metal rod 23.

A message 21 suggesting danger or caution is printed near the bottom end 12 of the front surface 22 of the sheet 10. In the first embodiment the message 21 is in 3-inch block lettering of black color to contrast with the bright orange color of the sheet 10 and reads "OUT OF SERVICE", centered between the two sides 16 of the sheet. The message is preferably at no point more than two feet from the bottom edge 18 of the sheet 10 for reasons to be discussed later. On the reverse surface (not shown) of the sheet 10 an alternate message can be printed, such as "NEED HELP", in a similar position near the bottom end 12 of the sheet 10.

Preferably, the metal bar 23 is disposed within the passageway 20 and extends an inch beyond either side 16 of the sheet 10, and a transverse hole 24 extends through each end of the rod 23. A tension spring 26 is attached to each of the holes 24, and the other end of each spring 26 is provided with a hook 28. Alternatively, a shock cord (not shown) can be inserted through the passageway 20 and attached to hooks 28, replacing bar 22 and spring 26. In the form shown, the roller assembly 14 includes a roller 13 defined by a wooden dowel 30 to which the sheet 10 is attached by small nails or glue or other suitable means. The dowel 30 is of a length to extend beyond each side 16 of the sheet 10 and is of uniform diameter except for a reduced portion 32 at each end. Fixed to each reduced portion 32 is a flanged ring 34 made up of a cylindrical portion 36 and a flange portion 38 of annular cross-section extending perpendicularly from one end of the cylindrical portion 36. The thickness of the cylindrical portion is such that its surface is flush with the surface of the dowel 30. A plastic end cap 40 is attached to each ring 34 by pins 42 which extend through annular portion 38 into cap 40. The cap 40 has a circular cross-section and is of a diameter slightly more than that of outside edge 39 of the flange portion 38 and is disposed flush with the annular flange portion 38.

An outer cylindrical cover tube 44 is concentric with the dowel 30 and has an inside diameter slightly greater than the diameter of the outside edge 39 and a length slightly less than the inside distance between the caps 40. The tube 44 is disposed between caps 40 and held in concentric relation to dowel 30 by contact with the edge 39 of flange portion 38. The clearance between the tube 44 on the one hand and the edge 39 and caps 40 on the other hand is adequate to allow the apparatus, including dowel 30, ring 34 and cap 40, to turn within the tube 44 in order to roll or unroll the windings 46 of the sheet 10 onto and from the tube 44, respectively. The tube 44 has a slot 48 with opposite closed ends 50 of a length slightly greater than the width of the sheet 10 through which the sheet passes so that it can feed off from the dowel to its display position.

The roller assembly 14 is supported by two plastic ties or fastener rings 52 which extend around the tube 44 at each end between the cap 40 and end of the slot 50. Each tie 52 connects to an upper tension spring 54 which is suspended by a hook 55 to an edge of a hole in a frame member of the vehicle (not shown), for example, on the under surface of the trunk lid of a car in which the device is to be installed.

FIGS. 3 and 4 demonstrate use of the embodiment of FIGS. 1 and 2 in a car 60. The device has particular utility in bringing attention to a car which has stalled or is stopped on or near a roadway and cannot be moved. For example, it is useful for marking a car which is in an incapacitated state, and provides a method for easy identification of the vehicle. Another use for the warning device is for a car which is incapacitated in a snowstorm or other bad weather in an isolated area in which the occupants of the car are forced to remain inside the car for survival or comfort but are desirous of obtaining the aid of police. The device will serve in such an instance to advise passing motorists and police of a car in trouble.

The roller 14 containing sheet 10 is normally stored attached to the inner surface 62 of the trunk lid 64 either as previously described or by a suitable bracket represented at 61. When the sheet 10 is rolled onto the dowel 30, the bottom end 12 is prevented from advancing through the slot 48 by the metal bar 22 which is thicker and longer than the slot 48.

When the warning device is to be used the trunk lid 64 is opened as in FIG. 3 so as to expose the trunk area 65. The sheet 10 can be withdrawn a partial distance as shown in FIG. 4 to the desired length for full visibility and the weight of the bar 22 will keep the surface of the sheet 10 straight and fairly taut. The advantage of locating the message 21 near the bottom end 12 of the sheet 10 can now be seen, since it will be completely visible even when the sheet is only partially unrolled. The sheet will not tend to unroll any further than it is pulled, since the friction between the rotatable brass ring 34 and the nonrotatable tube 44 at the ring's edge 39 will retard the unrolling forces on the sheet caused by the weight of the bar 22 or wind pressure on the sheet 10. Should there be a breeze, the bottom end 12 can be attached to the car 60 by the hooks 28 at any convenient point to keep the sheet from flapping. Points to which the hooks could be attached include the rear lip 66 of the trunk opening or the lower edge 68 of the bumper 69.

If the car is to be left for some time or is stopped in bad weather, the sign may be quickly fastened to indicate danger to other motorists while the car is closed and locked. FIGS. 5 and 6 demonstrate the embodiment of the invention in FIGS. 1 and 2 in use for such a situation. The hooks 55 can be disconnected from the storage location in the trunk and relocated near the forward edge of the trunk as shown in FIG. 6 to minimize the length of sheet required. After the sheet 10 is partially unrolled similarly to FIG. 4 the end 12 is fed through the crack 70 between the lid 64 and the front lip 72 of the trunk. The sheet 10 is then pulled over the outer surface 74 of the trunk lid 64 and down the rear surface 76 of the car 60 as the trunk is closed where the hooks 28 on tension springs 26 are fastened to the lower edge 68 of the bumper. The narrow width of the sheet 10 assures that taillights 78 of the car 60 will be visible so that they can be left on or flashing as an added safety precaution. The proximity of the message 21 to the bottom end 12 of the sheet 10 locates the message on the rear surface 76 in a vertical orientation so that it can be read by oncoming motorists.

The roller 14 also can be unhooked at hooks 55 or from the bracket 61 in the modified form to create a portable flag which can be hand-held to signal passing motorists.

In a situation in which the car is stopped broad-side to oncoming traffic the roller 14 can be inserted into an open window on the side of the car facing the traffic which is then closed to grip the sheet 10 while the bottom end 12 of the sheet is fastened by the hooks 28 to the lower edge of the car below the window gripping the upper end of the sheet 10.

If the device is to be used for signaling a police car the "NEED HELP" message on the reverse surface (not shown) of the sheet 10 can be displayed by removing the roller 14 from its mounting and replacing it in a reversed position. Thus, when it is unrolled the reverse surface will face the rear of the car and be visible to oncoming traffic. The message on the reverse surface can be used in any of the ways previously described while attached to the trunk lid 64 or it can be employed in one of the portable usages described in the preceding two paragraphs.

The embodiment of the invention shown in FIGS. 1 to 6 includes a roller assembly 14 as described in which end caps 40 are turned in relation to the enclosing tube 44 to rewind the sheet back onto the dowel 30 after there is no longer a need for the device. The advantage of this roller is that it is very cheap and durable and is not harmed by water. It should be understood, however, that a spring-loaded clutch roller of the type used on window shades could also be used in the spirit of the invention to facilitate restorage of the sheet after use, if desired. To replace the sheet held by a spring roller, a slight tug would then be needed to release the clutch and cause the spring to rewind the sheet onto the roller.

In the modified form of warning device shown in FIGS. 7 to 9, like parts are designated by corresponding numerals. Specifically, the modified form shares a number of common features with that of the first embodiment in its portability and versatility for use in a number of different positions as well as its ready conformability for mounting on different vehicles.

As shown in FIGS. 7 to 9, the warning device 80 comprises a safety curtain 10 again composed preferably of a safety orange plastic material of generally rectangular configuration; and, for example, the curtain is dimensioned to be on the order of 6 feet long by 2 feet wide. The curtain has a free bottom end 12 and an upper end secured to an elongated mounting plate or bar 82, the latter having quick-releasable fasteners 84 at opposite ends thereof just outwardly of the sides of the curtain 10. The opening or passageway 20 formed at the lower end 12 receives a rod 86 of generally rectangular cross-section and which may be suitably composed of a strong durable material, such as metal or plastic.

One or more messages suggesting danger, such as the message 21, are placed on the curtain 10 in the same manner as described with respect to the first embodiment. The rod 86 at the lower end of the curtain 10 is provided with a pair of openings or bores 87 adjacent to opposite ends, each for the purpose of receiving an elastic cable or shock cord 88 which is looped through one of the bores 87 and has its lower ends 89 affixed within a sleeve 90 to which is connected a hook member 92. An outer flexible sheath 93 may be placed over the cable 88 to protect it against accidental damage or wear under repeated use.

The mounting bar 84 replaces the roller assembly 14 of the first form and is most desirably composed of a lightweight but strong synthetic plastic material to which the upper end of the curtain is attached such as by forming a pocket or opening in the upper end of the curtain by means of a hem represented at 93. The hem may be formed in a conventional manner by bonding or stitching the layers of material together along the hem section 93 so as to leave a pocket or opening of sufficient size for snug-fitting insertion of the mounting bar 84. The curtain 10 then can be wrapped or manually rolled around the bar in the manner illustrated in FIG. 8. Each releasable fastener 86 is preferably defined by a permanent magnet 94 mounted in a holder 95 which is bonded as at 96 to the flat surface of the bar 84. The holder is open at its opposite end to expose the magnet 94 which extends slightly beyond the edge of the holder as shown in FIG. 8. To provide a firm attachment, a series of magnet plates composed of a permanent magnetic material such as Alnico may be mounted in spaced side-by-side relation to one another.

In use, the warning device is once again adapted for storage inside of the trunk; and by means of the releasable fasteners 86 may be affixed to the inner surface 62 of the trunk lid 64 as hereinbefore described with respect to the first embodiment. In the event of an emergency, such as, when the car is stalled on the highway, the trunk lid is opened and the warning device removed from the inner surface 62 of the lid so that the curtain 10 can be unrolled from the mounting bar 84. When the curtain is unrolled to the desired length, the hook members 92 can be conveniently attached either to the lower portion of the trunk, the body of the car, or the lower edge 68 of a bumper 69. Thereafter, the releasable fasteners 86 may be re-attached to the inner surface 62 of the trunk lid so that the curtain is stretched vertically across the opening of the trunk to present the warning signal. Since the mounting bar 84 is relatively flat, the curtain can be unwrapped to the desired length and, once attached, will not tend to slip or rotate with respect to the mounting bar.

Again, as described with reference to the preferred form in FIGS. 5 and 6, the alternate form of invention as shown in FIG. 9 can be attached to the inner surface of the trunk lid with the curtain passing through the crack 70 between the lid 64 and front lip 72 of the trunk, then extended rearwardly over the external surface 74 and attached to the lower edge 68 of the bumper 69. Since the warning message is located more nearly adjacent to the lower edge of the curtain, it will appear along the lower portion of the trunk lid so as to be readily visible.

Use of the magnetic fasteners 86 permits ready mounting of the warning device along the front or side of the vehicle merely by attaching to its external surface. Moreover, the device may be hand-held if desired simply by releasing the desired length of curtain from the mounting bar and holding one end of the mounting bar 84.

Although the present invention has been described with a certain degree of particularity, it is understood that the present disclosure has been made by way of example and that changes in details of structure may be made without departing from the spirit thereof.

What is claimed is:

1. An emergency warning device for an automotive vehicle wherein the vehicle includes a trunk lid hinged along its upper edge to form a space between the trunk lid and body of the motor vehicle when the trunk lid is open and has a lower edge terminating directly above the rear bumper of the motor vehicle, the improvement comprising:

a curtain support member having releasable mounting means at opposite ends thereof releasably attachable to the inner surface of said trunk lid, a curtain of brightly colored, flexible material having top and bottom ends, front and reverse surfaces, a message or symbol on said front surface indicating danger or caution at least a portion of which is visibly discernable within the bottom one-third of the length of said curtain nearest said bottom end, and means fixing the upper end of said curtain to said curtain support member such that rotation of said curtain support member will cause said curtain to be wound onto said curtain support member, said curtain being of a length such that when said releasable mounting means is attached to the inner surface of said trunk lid said curtain will extend alternately downwardly for visibly displaying said message or symbol rearwardly of the vehicle when the trunk lid is open, or forwardly through the space between said trunk lid and the body of the motor vehicle and rearwardly along the length of said trunk lid and beyond the lower edge thereof for visibly displaying said message or symbol discernable portion rearwardly of the vehicle when the trunk lid is closed, and lower connecting means at the bottom end of said curtain for releasably attaching said bottom end to a portion of the vehicle thereby holding said curtain in a substantially extended condition.

2. An emergency warning device according to claim 1, said curtain support member including magnets at opposite ends thereof.

3. An emergency warning device as defined in claim 1 wherein said lower attaching means includes a hem sewn in said bottom end of the curtain forming a passageway the width of said curtain, a rod disposed within said passageway, and releasable connectors at each end of said rod being releasably attachable to a portion of said vehicle.

4. An emergency warning device as defined in claim 1 wherein said material is plastic and is of "safety orange" color.

5. An emergency warning device adapted for use with disabled motor vehicles of the type provided with an exterior hinged trunk lid comprising:
   a roller assembly having a generally cylindrical cover tube with a longitudinal closed slot extending substantially the length of said tube, a roller member of approximately equal length to said tube concentrically and rotatably disposed within said cover tube, a ring at each end of said roller fixed to and rotatable with said roller, a circular outer edge of each of said rings in frictional, rotatable bearing contact with one end of the inner surface of said tube, and end cap means fixed to each ring for manually rotating said ring and said roller independently of said cover tube,
   releasable mounting means adjustable in length nonrotatably attaching said cover tube to the inner surface of said trunk lid,
   a flexible, elongated, rectangular warning sheet having a width less than the width of the closed slot in the tube, a top and a bottom end, front and reverse surfaces, and the upper end of said sheet being fixed to said roller, said sheet being of a length for extending alternately downwardly from the trunk lid to the lower rear portion of the vehicle when the trunk lid is open or forwardly through the space between the trunk lid and vehicle body and rearwardly along the length of the trunk lid and beyond the lower edge thereof when the trunk lid is closed,
   an open passageway along the bottom end substantially across the width of said sheet,
   a rod of a length greater than the length of said slot in the tube disposed within said passageway, spring means at opposite ends of said bar including a releasable connector, and
   a warning message on the front surface of said sheet located entirely within a square area at the bottom end of said sheet, said message being visibly discernable rearwardly of the vehicle for either of said sheet extensions.

6. An emergency warning device according to claim 5, said rectangular sheet being of a length at least twice the length of said trunk lid.

7. An emergency warning device according to claim 5, said releasable mounting means for said cover tube being adjustable in length and releasably attachable to the inner surface of said trunk lid.

8. An emergency warning device according to claim 5, said releasable mounting means being defined by outer rings in surrounding relation to opposite ends of said cover tube, a tension spring attached to each of said outer rings and a suspension hook at the free end of each spring.

9. An emergency warning device according to claim 5, said end cap means each being defined by a circular disc having a greater diameter than the diameter of said cover tube, said cover tube being disposed between said end cap and prevented from longitudinal movement with respect to said roller member by said end cap.

10. An emergency warning device for a motor vehicle in which the vehicle is provided with an exterior trunk lid hinged along its upper end and terminating at its lower end above the rear bumper portion of the vehicle, the improvement comprising:
    an elongated flat mounting bar having releasable mounting means at opposite ends thereof releasably attachable to the inner surface of said trunk lid,
    a generally rectangular curtain composed of brightly colored flexible material having top and bottom ends, front and reverse surfaces, the top end of said curtain being attached to said mounting bar between said releasable mounting means, and said curtain being of a length between its top and bottom ends to extend from the point of releasable attachment to the inner surface of the trunk lid alternately in a downward direction when the trunk lid is open or extend forwardly through the space between the upper end of said trunk lid and the body of the motor vehicle then rearwardly over the entire length of the trunk lid, when the trunk lid is closed,
    lower connecting means at the bottom end of said curtain for releasably attaching said bottom end in either position beneath the trunk lid thereby securing said curtain for downward extension when the trunk lid is open or for extension over the external surface of said trunk lid when the trunk lid is closed, and
    a message on the front surface of said curtain located adjacent to the bottom end of said curtain for providing a visible display rearwardly of the vehicle when said curtain is in either of said extended relationships.

11. An emergency warning device according to claim 10, said releasable mounting means being defined by permanent magnets mounted in holders at opposite ends of said mounting bar.

12. An emergency warning device according to claim 10, said lower connecting means defined by a rod extending through an opening along the bottom end of said curtain, and resilient cables extending through opposite ends of said rod including hook members at the end of each cable opposite to its attachment to said rod.

13. An emergency warning device according to claim 12, said cables being of a length for extension between the bottom end of said curtain and the lower end of the bumper on said motor vehicle.

* * * * *